(12) United States Patent
Whitaker et al.

(10) Patent No.: US 9,647,563 B1
(45) Date of Patent: May 9, 2017

(54) ACTIVE ENERGY RECOVERY CLAMPING CIRCUIT TO IMPROVE THE PERFORMANCE OF POWER CONVERTERS

(71) Applicant: Arkansas Power Electronics International, Inc., Fayetteville, AR (US)

(72) Inventors: Bret Whitaker, Fayetteville, AR (US); Adam Barkley, Springdale, AR (US)

(73) Assignee: Cree Fayetteville, Inc., Fayetteville, AR (US)

( * ) Notice: Subject to any disclaimer, the term of this patent is extended or adjusted under 35 U.S.C. 154(b) by 0 days.

(21) Appl. No.: 14/634,252

(22) Filed: Feb. 27, 2015

Related U.S. Application Data

(60) Provisional application No. 61/945,590, filed on Feb. 27, 2014.

(51) Int. Cl.
*H02M 3/335* (2006.01)
(52) U.S. Cl.
CPC ............... *H02M 3/33507* (2013.01)
(58) Field of Classification Search
CPC .................................................. H02M 3/335
See application file for complete search history.

(56) References Cited

U.S. PATENT DOCUMENTS

| | | | |
|---|---|---|---|
| 4,703,409 A | 10/1987 | Spreen | |
| 6,538,906 B1 * | 3/2003 | Ke | H02M 3/33569 323/288 |
| 7,161,331 B2 * | 1/2007 | Wai | H02M 1/34 323/222 |
| 7,317,305 B1 | 1/2008 | Stratakos et al. | |
| 7,449,867 B2 | 11/2008 | Wu et al. | |
| 7,498,783 B2 | 3/2009 | Johnson | |
| 8,427,120 B1 | 4/2013 | Cilio | |
| 2008/0043498 A1 * | 2/2008 | Mohandes | H02M 1/34 363/22 |
| 2008/0094866 A1 * | 4/2008 | Bauman | H02M 1/34 363/50 |
| 2009/0179713 A1 | 7/2009 | Zeng et al. | |
| 2013/0320954 A1 * | 12/2013 | Capofreddi | H02M 3/1582 323/311 |

* cited by examiner

*Primary Examiner* — Emily P Pham
(74) *Attorney, Agent, or Firm* — Baker Hostetler LLP

(57) ABSTRACT

A regenerative clamping circuit for a power converter using clamping diodes to transfer charge to a clamping capacitor and a regenerative converter to transfer charge out of the clamping capacitor back to the power supply input connection. The regenerative converter uses a switch connected to the midpoint of a series connected inductor and capacitor. The ends of the inductor and capacitor series are connected across the terminals of the power supply to be in parallel with the power supply.

20 Claims, 4 Drawing Sheets

US 9,647,563 B1

ACTIVE ENERGY RECOVERY CLAMPING CIRCUIT TO IMPROVE THE PERFORMANCE OF POWER CONVERTERS

CROSS-REFERENCE TO RELATED APPLICATIONS

This application claims priority to and is a continuation-in-part of U.S. Provisional Patent Application Ser. No. 61/945,590, filed on Feb. 27, 2014 entitled ACTIVE ENERGY RECOVERY CLAMPING CIRCUIT TO IMPROVE THE PERFORMANCE OF POWER CONVERTERS, which is hereby incorporated by reference in its entirety.

STATEMENT REGARDING FEDERALLY SPONSORED RESEARCH OR DEVELOPMENT

This invention was made with government support under grant DE-AR0000111 awarded by the United States Department of Energy (ARPA-E). The United States government has certain rights in the invention.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in power converters. More particularly, the invention uses clamping diodes to transfer excess energy to a storage capacitor to temporarily store the excess energy until it can be recycled back into the host power converter. In particular, the present invention relates specifically to an active energy recovery clamp circuit including a clamping circuit and a regenerative converter.

2. Description of the Known Art

As will be appreciated by those skilled in the art, power supply topologies are known in various forms. Patents disclosing information relevant to power supplies include: U.S. Pat. No. 8,427,120, issued to Cilio on Apr. 23, 2013 entitled Coupled inductor output filter; U.S. Pat. No. 4,703,409, issued to Spreen on Oct. 27, 1987 which is entitled Coupled power supply inductors for reduced ripple current; U.S. Pat. No. 7,317,305, issued to Stratakos et al. on Jan. 8, 2008 which is entitled Method and apparatus for multi-phase dc-dc converters using coupled inductors in discontinuous conduction mode; U.S. Pat. No. 7,449,867, issued to Wu et al. on Nov. 11, 2008 which is entitled Multi-phase buck converter with a plurality of coupled inductors; and U.S. Pat. No. 7,498,783, issued to Johnson on Mar. 3, 2009 which is entitled Extending the continuous mode of operation for a buck converter. Patents and/or applications relating to coupled inductors also include the basic electrical components of the present design as noted by United States Patent No. 2009/0179713 filed by Zeng et al. published on Jul. 16, 2009 entitled Low pass filter incorporating coupled inductors to enhance stop band attenuation. Each of these patents and applications is hereby expressly incorporated by reference in their entirety.

From these prior references it may be seen that these prior art patents are very limited in their teaching and utilization, and an improved active energy recovery clamp is needed to overcome these limitations.

SUMMARY OF THE INVENTION

The present invention is directed to an improved active energy recovery clamp, AERC, circuit comprised of a clamping circuit and a regenerative converter. The AERC circuit is applied to a host power converter to provide improved performance. The clamping circuit of the AERC uses a diode for each power device on the host converter where the peak voltage stress must be clamped. The clamping diodes transfer excess energy from the switching node to a capacitor that stores the energy for a brief period. This energy is then recycled back to the input of the host power converter using the regenerative converter. The AERC circuit is shown below where it is used on a push-pull converter topology and the regenerative converter is a buck topology. These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
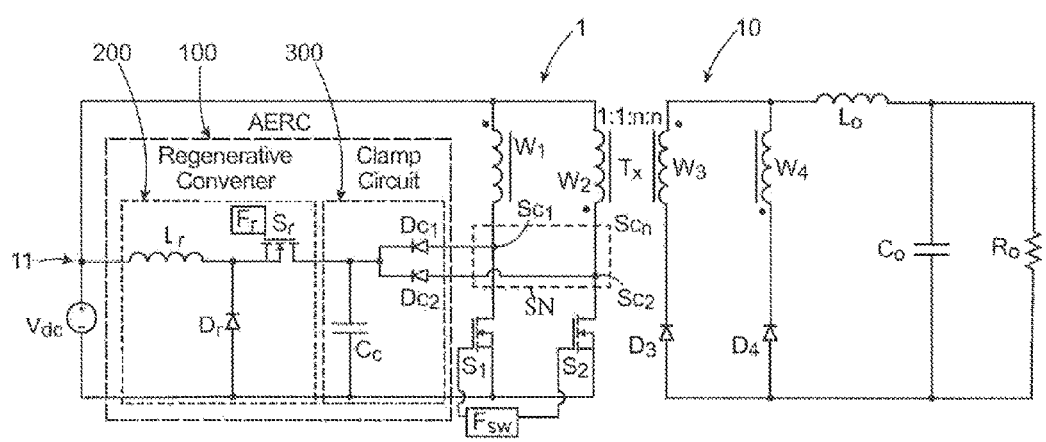
FIG. 1 is a circuit diagram of the active energy recovery clamp circuitry with a push-pull converter as the host.

As shown in FIG. 1 of the drawings, one exemplary embodiment of the present invention is generally shown as a power converter system 1 using an active energy recovery clamp circuit 100, also known as AERC circuit 100, comprised of a clamping circuit 300 and a regenerative converter 200. The AERC circuit 100 is electrically connected between a direct current voltage supply Vdc and a host converter 10.

The direct current voltage supply Vdc has a positive output supplying an input node 11 and a negative terminal.

The host power converter 10 includes a transformer TX. The transformer is a 1:1:n:n type transformer with the polarities as shown by standard dot convention noting phase relationship of the windings. The ends of the windings will be referred to as dot ends and clear ends. For this description only, a top dot will be described as phase one and a bottom dot will be scribed as phase two. Thus, the transformer TX includes an input phase one first winding W1, an input phase two second winding W2, an output phase one third winding W3, and an output phase two fourth winding W4.

The input phase one first winding W1 dot end is electrically connected to the input node 11. The input phase one first winding W1 clear end is electrically connected to the drain of the first switch power device S1 forming the first switch connection Sc1 in the switching node SN. The first switch connection Sc1 is also connected to the anode of the first clamping diode Dc1. The source of the first switch power device S1 is electrically connected to negative terminal of the direct current voltage supply VDC.

The input phase two second winding W2 clear end is electrically connected to the input node 11. The input phase two second winding W2 dot end is electrically connected to the drain of the second switch power device S2 forming the second switch connection Sc2 in the switching node SN. The second switch connection Sc2 is also connected to the anode of the second clamping diode Dc2. The source of the second switch power device S2 is electrically connected to negative terminal of the direct current voltage supply VDC.

The gates of the first switch power device S1 and the second switch power device S2 are frequency timed at a switching frequency Fsw to drive the power converter 10.

The output phase one third winding W3 dot end is electrically connected to the first end of the output inductor Lo and the output phase two fourth winding W4 clear end. The output phase one third winding W3 clear end is electrically connected to the cathode of the first converter diode D3.

The output phase two fourth winding W4 clear end is electrically connected to the first end of the output inductor Lo and the output phase one third winding W3 dot end. The output phase two fourth winding W4 dot end is electrically connected to the cathode of the second converter diode D4. The anode of the second converter diode D4 is electrically connected to the anode of the first converter diode D3.

The second end of the inductor Lo is electrically connected to the top of the output capacitor Co and the first end of the output resistor Ro. The bottom of the output capacitor Co is electrically connected to the second end of the output resistor Ro and the anodes of the first converter diode D3 and the second converter diode D4.

The regenerative converter 200 includes a regenerative inductor Lr, regenerative diode Dr, and regenerative switch Sr. The regenerative inductor Lr is electrically connected between the input node 11 and the cathode of the regenerative diode Dr. The cathode of the regenerative diode Dr is also electrically connected to the source of the regenerative switch Sr, and the anode of the regenerative diode Dr is electrically connected to the negative terminal of the voltage supply VDC. The gate of the regenerative switch Sr is frequency timed with a regenerative frequency Fr and driven to control the regeneration back to the input node 11. The drain of the regenerative switch Sr is connected to the clamping circuit 300 at one terminal of the energy storage device, shown as a clamping capacitor Cc.

The clamping circuit 300 includes a first clamping diode Dc1, second clamping diode Dc2, and an energy storage device shown as a clamping capacitor Cc. The energy storage device can be any device that can capture and store the power to be regenerated and is shown as a clamping capacitor Cc in the preferred circuit embodiment shown. The top terminal of the clamping capacitor Cc is connected to the regenerative converter 200 at the drain of the regenerative switch Sr, and the bottom terminal is connected to the negative terminal of the voltage supply VDC. Both the cathode of the first clamping diode Dc1 and the cathode of the second clamping diode Dc2 are connected to the top terminal of the clamping capacitor Cc and the drain of the regenerative switch Sr. The anode of the first clamping diode Dc1 is connected to the drain of the first switch power device S1. The anode of the second clamping diode Dc2 is connected to the drain of the second switch power device S2.

The AERC circuit 100 is applied to a host power converter 10 to provide improved performance. The clamping circuit 300 of the AERC 100 uses a diode DC1, DC2 for each power device S1, S2 on the host converter 10 where the peak voltage stress must be clamped. The clamping diodes DC1, DC2 transfer excess energy from the switching node SN to a capacitor CC that stores the energy for a brief period. This energy is then recycled back to the input node 11 of the host power converter 10 using the regenerative converter 200. FIG. 1 shows the AERC circuit 100 where it is used on a push-pull converter 10 topology and the regenerative converter 200 is a buck topology. Note that while the host converter 10 is shown as a push-pull converter, the AERC circuitry 100 can be applied to any power converter 10 with voltage spike issues.

Advantages provided by the AERC circuitry 100 to the host converter 10 include limiting the voltage spike across the main power devices S1, S2; recirculating the energy stored in the clamping capacitor CC back to the input node 11; adding damping to the system 1 without adding significant losses; and improving the overall efficiency of the host converter 10. The AERC circuitry 100 also benefits from complete circuit decoupling that allows for the regenerative converter 200 to operate at any arbitrary switching frequency independent of the switching frequency of the host converter 10. This allows for lower performance, and lower cost, components LR, SR, DR to be utilized for the regenerative converter 200 when compared to those used for the host converter 10. Also by operating at a lower frequency the efficiency of the regenerative converter 200 can be very high.

The AERC circuitry 100 can provide benefits specifically to the push-pull converter 10 topology. The push-pull converter 10 is conventionally limited in its application due to the energy stored in the leakage inductance of the transformer. This energy is linearly proportional to the switching frequency and exponentially proportional to the output current. The utilization of AERC circuitry 100 negates these limitations by allowing all of this energy to be recycled very efficiently. The AERC circuitry 100 concept was experimentally tested on a push-pull converter 10.

Figure 2:
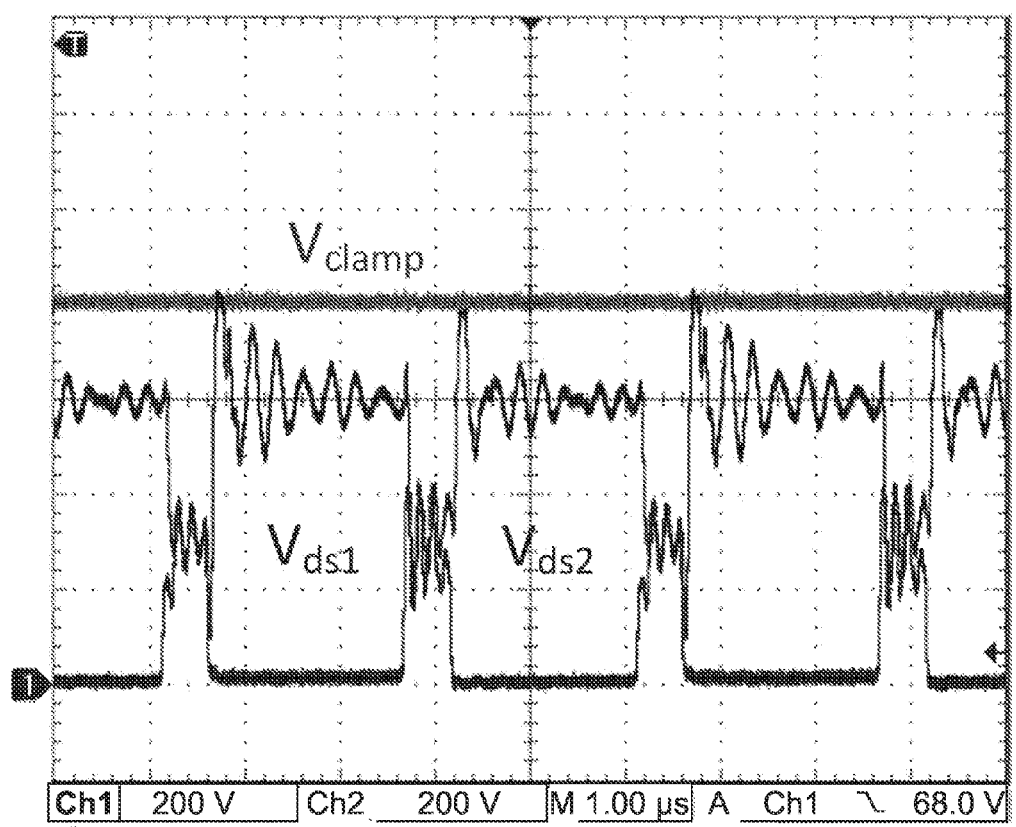
FIG. 2 shows waveforms from the push-pull converter with active energy recovery clamp.
Figure 3:
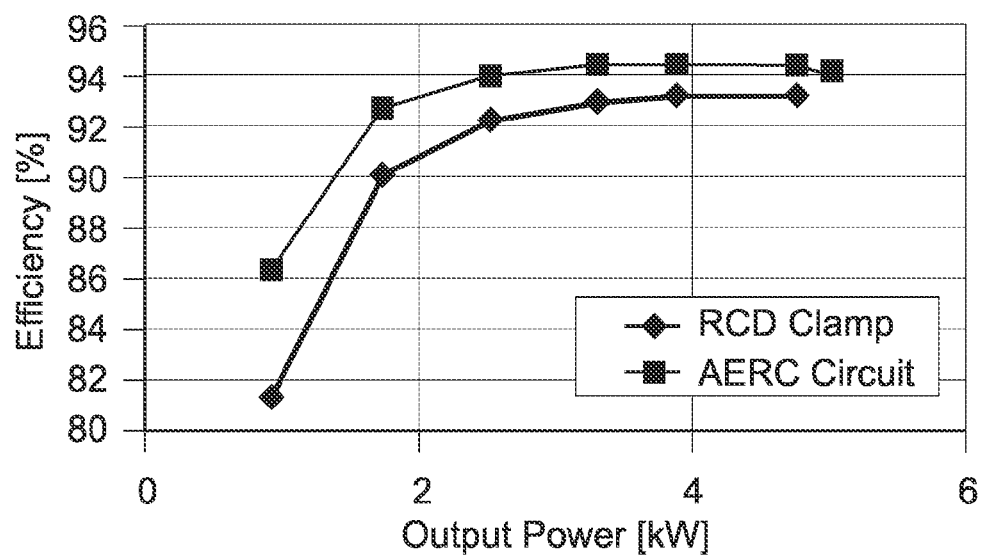
FIG. 3 shows an active energy recovery clamp circuitry vs. resistor-capacitor-diode clamp efficiency comparison of a push-pull converter.
Figure 4:
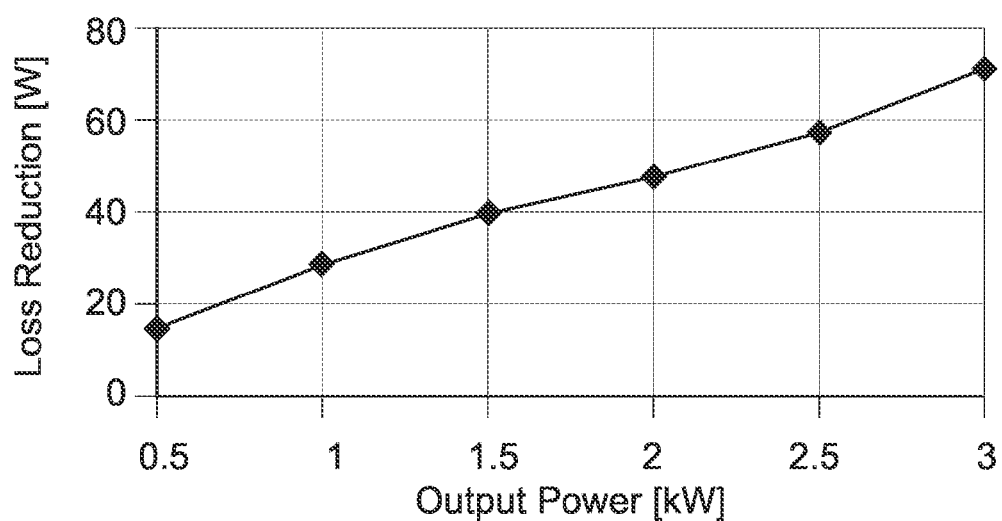
FIG. 4 shows the loss reduction when using the active energy recovery clamp circuitry instead of a resistor-capacitor-diode clamp for a push-pull converter.

FIG. 2 shows the waveforms from push-pull converter 10 with AERC circuitry 100 with Vdc=300V, Vo=240V, Ro=40Ω, Fsw=200 kHz. Experimental efficiency results are shown in FIG. 3 for a push-pull converter 10 with 300 V input applied and a switching frequency of 200 kHz for the push-pull converter 10 and 20 kHz for the regenerative converter 200 where the AERC circuitry 100 is compared to a conventional resistor-capacitor-diode clamp, RCD clamp, that uses a resistor to dissipate all of the excess energy as heat. It can be seen that the AERC circuitry 100 provides a significant improvement in the converter efficiency across all of the levels of output power. The amount of power loss saving vs. the output power of the converter is summarized in FIG. 4 that shows the power loss reduction when using the AERC circuitry 100 instead of an RCD clamp for a push-pull converter 10 with 300 V input applied and a switching frequency of 200 kHz for the push-pull converter 10 and 20 kHz for the regenerative converter 200.

Reference numerals used throughout the detailed description and the drawings correspond to the following elements:

power converter system 1
direct current power supply Vdc
host power converter 10
first switch power device S1
second switch power device S2
switching node Sn
output resistor RO
output capacitor CO
output inductor LO
first converter diode D3
second converter diode D4
transformer TX
first winding W1
second winding W2
third winding W3
fourth winding W4
switching frequency Fsw
input node 11
active energy recovery clamp circuit 100
regenerative converter 200
regenerative inductor Lr
regenerative diode Dr
regenerative switch Sr
clamping circuit 300
first clamping diode Dc1
second clamping diode Dc2
clamping capacitor Cc From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. A power converter clamping circuit apparatus for a power converter, the power converter powered by a power supply, the power converter clamping circuit apparatus comprising:
at least two switch power devices;
a clamping circuit electrically connected between a switching node of the power converter and the power supply, the clamping circuit comprising:
a first clamping diode connected to a first winding of a transformer at a first switching connection of the switching node, and
a second clamping diode connected to a second winding of the transformer at a second switching connection of the switching node, wherein the switching node is electrically connected to the at least two switch power devices; and
a regenerative converter electrically connected between the clamping circuit and the power supply.

2. The power converter clamping circuit apparatus of claim 1, wherein the first clamping diode and the second clamping diode are configured to transfer energy from the switching node to a capacitor.

3. The power converter clamping circuit apparatus of claim 1, the clamping circuit further comprising:
a clamping capacitor electrically connected to the first clamping diode.

4. The power converter clamping circuit apparatus of claim 3, the regenerative converter comprising:
a regenerative switch electrically connected to the clamping capacitor.

5. The power converter clamping circuit apparatus of claim 4, the regenerative converter further comprising:
a regenerative inductor electrically connected between the regenerative switch and the power supply.

6. The power converter clamping circuit apparatus of claim 5, the regenerative converter further comprising:
a regenerative diode electrically connected between the regenerative switch and the power supply.

7. A host power converter connected to the power converter clamping circuit apparatus of claim 1, wherein the host power converter further comprises a third winding having one end electrically connected to an output inductor.

8. The host power converter connected to the power converter clamping circuit apparatus of claim 7, wherein another end of the third winding is electrically connected to a converter diode.

9. The power converter clamping circuit apparatus of claim 1, wherein the clamping circuit is applied to a host power converter.

10. The power converter clamping circuit apparatus of claim 1, wherein the at least two switch power devices are configured to be frequency timed to drive a power converter.

11. A power converter circuit apparatus powered by a power supply having a first power connection and a second power connection, the power converter circuit apparatus comprising:
a transformer including a first input winding electrically connected to the first power connection and also electrically connected to a first switch connection at a switching node, and a second input winding electrically connected to the first power connection and to a second switch connection at the switching node;
the first switch connection and the second switch connection also electrically connected to the second power connection;
the first input winding and the first switch connection are series electrically connected to the power supply;
the second input winding and the second switch connection are series electrically connected to the power supply;

the switching node is electrically connected to at least two switch power devices;

a clamping circuit electrically connected between the switching node and the second power connection; and a regenerative converter electrically connected between the clamping circuit and the first power connection.

12. A host power converter connected to the power converter clamping circuit apparatus of claim 11, wherein the host power converter comprises a third winding having one end electrically connected to an output conductor.

13. The host power converter connected to the power converter clamping circuit apparatus of claim 12, wherein another end of the third winding is electrically connected to a converter diode.

14. The power converter clamping circuit apparatus of claim 11, wherein the at least two switch power devices are configured to be frequency timed to drive a power converter.

15. The power converter circuit apparatus of claim 11, the clamping circuit comprising:

a first clamping diode electrically connected to the switching node.

16. The power converter circuit apparatus of claim 15, the clamping circuit further comprising:

a clamping capacitor electrically connected to the first clamping diode.

17. The power converter circuit apparatus of claim 16, the clamping circuit comprising:

a second clamping diode electrically connected between the second switch connection and the clamping capacitor.

18. The power converter circuit apparatus of claim 16, the regenerative converter comprising:

a regenerative switch electrically connected to the clamping capacitor.

19. The power converter circuit apparatus of claim 18, the regenerative converter further comprising:

a regenerative inductor electrically connected between the regenerative switch and the power supply.

20. The power converter clamping circuit apparatus of claim 19, the regenerative converter comprising:

a regenerative diode electrically connected between the regenerative switch and the power supply.

* * * * *